No. 747,320. PATENTED DEC. 15, 1903.
P. S. FITCH.
DEVICE FOR CUTTING TUBES AND FLUES FROM BOILERS.
APPLICATION FILED APR. 8, 1903.
NO MODEL.
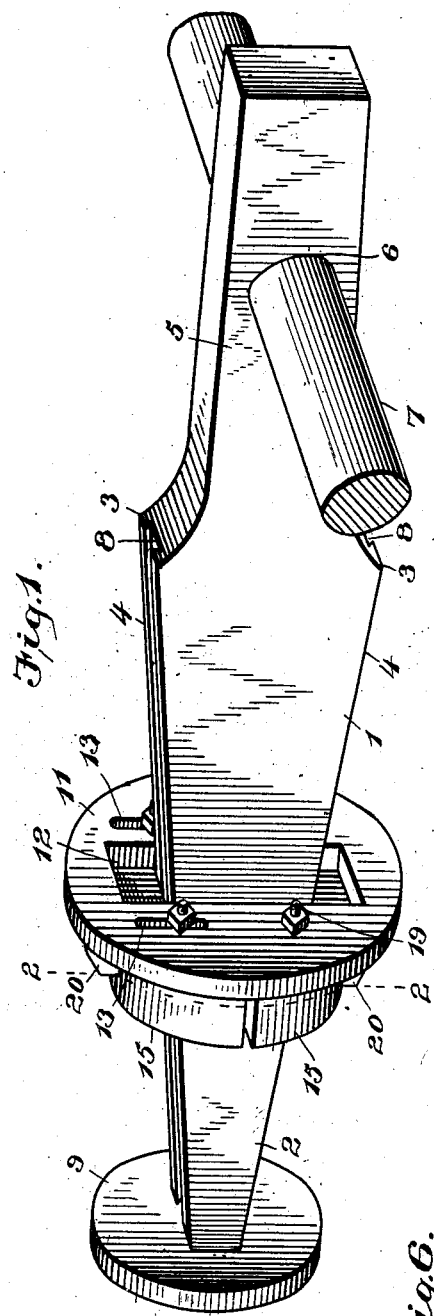
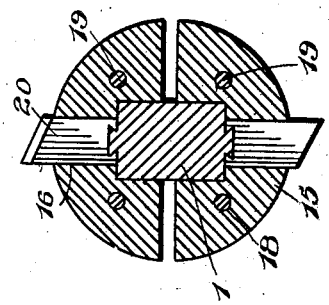
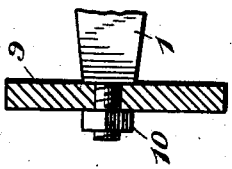
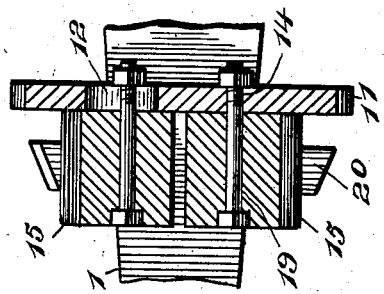
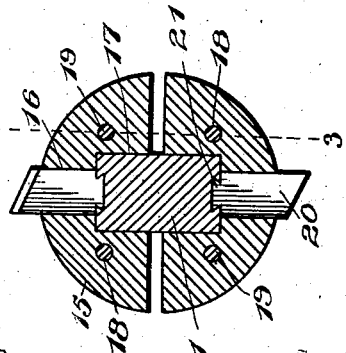
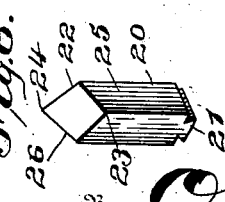
Witnesses
J. P. Britt
T. D. Leckie
Inventor
Philip S. Fitch,
By C. E. Duffy & Son
Attorneys No. 747,320. Patented December 15, 1903.

UNITED STATES PATENT OFFICE.

PHILIP S. FITCH, OF BELMORE, OHIO, ASSIGNOR OF ONE-HALF TO DAVID E. DOZER, OF DEFIANCE, OHIO.

DEVICE FOR CUTTING TUBES AND FLUES FROM BOILERS.

SPECIFICATION forming part of Letters Patent No. 747,320, dated December 15, 1903.

Application filed April 8, 1903. Serial No. 151,613. (No model.)

*To all whom it may concern:*

Be it known that I, PHILIP S. FITCH, a citizen of the United States, residing at Belmore, in the county of Putnam and State of Ohio, have invented certain new and useful Improvements in Mechanical Devices for Cutting Tubes and Flues in Boilers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to "pipe-cutters," but more particularly to devices for cutting tubes or flues from boilers, and has for its object to provide a device of this class which is particularly simple in construction, strong, durable, and efficient.

With this object in view my invention consists in the particular construction and arrangement of parts of the device, as will be first fully described and afterward specifically pointed out in the appended claims.

Referring to the accompanying drawings, Figure 1 is a perspective view of my device. Fig. 2 is a vertical cross-section taken on the line 2 2 of Fig. 1. Fig. 3 is a vertical longitudinal section taken on the line 3 3 of Fig. 2. Fig. 4 is a view, partly in section, of the small plate on the end of the device. Fig. 5 is a vertical cross-section showing a modification of Fig. 2. Fig. 6 is a perspective view of one of the knives.

Like numerals of reference indicate the same parts thoroughout the several figures, in which—

1 is the main bar, having a small end 2 tapering outwardly to the points 3, forming two inclined planes 4. From the points 3 the outer end 5 of the bar may be of any form, but preferably as shown, and an opening 6 is formed therein for the reception of the lever-bar 7, a portion of which bar is shown in Fig. 1.

The tapered or wedge portion of the main bar 1 is preferably provided with a dovetail groove 8 in each of the inclined sides, and the forward end of said bar carries a small circular plate 9, secured thereon by a nut 10.

11 indicates the main sliding plate, which is preferably circular in form and which is provided with an oblong opening 12 therein, within which the tapered or wedge portion of bar 1 enters. Said plate is also provided with a pair of slots 13 and a pair of bolt-openings 14 below the same, and it is in the particular construction of this plate and connecting parts that my invention consists.

15 indicates the two sliding knife-carrying sections, which are semicircular in form and which are provided with a vertical, preferably square, opening 16 therein and a cut-out portion 17 to conform to the tapered or wedge portion of bar 1. Said sections are each provided with bolt-holes 18, through which bolts 19 pass and through the plate 11, as shown in Fig. 3.

20 indicates the knives, which are carried in the openings 16 in the sections 15, and said knives are preferably provided with a dovetail tongue 21, which enters the groove 8 in the bar 1. Said knives have a cutting edge 22, which may be of any form or shape, but preferably as shown in detail in Fig. 6. It will be seen that the end of said knife is beveled from the corner 23 to the corner 24, which forms the point and not the flat edge, as would be the case were the knife beveled from the side 25 to the side 26. The cutting point and edge being thus formed, they are so arranged in the sections 15 that they present an inclined edge to the metal to be cut, so that when the device is revolved by the lever-bar 7 the tapered edge in entering the metal will have a tendency to cause the knives to move up the wedge portion of the bar 1, thereby spreading the knives apart.

In the modification shown in Fig. 5 I illustrate the knives provided with the dovetail grooves and the wedge portion of the bar 1 having the tongue.

The operation is as follows: The parts are assembled as shown, and when it is desired to cut a tube or flue out of a boiler the small end of the wedge 1, carrying plate 9, is inserted in the tube, the knives and plate 11 having been moved down the wedge, so that the faces of the knife-carrying sections are in contact with the plate 9. When in this position, the knives are entirely housed within the said sections, and the face of the plate 11 bears against the outer cover of the boiler. A few blows on the outer end 5 of the bar 1 will drive the wedge portion between the knife-carrying sections and knives, spreading the same and causing said knives to enter the tube. The lever-bar is then inserted, as shown, and the device is revolved, which causes the knives to cut out the boiler-tube in a neat manner without cracking the same.

It will be observed that the plate 11 furnishes a solid bearing against the boiler when driving the wedge into the tube, while the knife-carrying sections firmly support and brace the knives during their cutting operation, while at the same time said knives may be instantly removed therefrom by sliding them out of the dovetail grooves in order to sharpen or replace the same.

Having thus described my invention, I do not wish to be understood as limiting myself to the exact construction herein set forth, as various slight changes may be made therein which would fall within the limit and scope of my invention, and I consider myself clearly entitled to all such changes and modifications.

What I claim as my invention, and desire to secure by Letters Patent of the United States, is—

1. In a tube-cutter, the combination with the main bar having the wedge portion, of a solid plate, through which said wedge portion passes, semicircular knife-carrying sections secured to said solid plate, knives removably secured in said knife-carrying sections, and tongues on said knives adapted to enter grooves in said wedge-section.

2. In a tube-cutter, the combination with the main bar having the wedge portion, of a plate through which said wedge portion passes, knife-carrying sections secured to said plate, knives removably secured in said knife-carrying sections, and means for securing said knives and said wedge portion together.

3. In a tube-cutter the combination with the main bar having the wedge portion, of a plate through which said wedge portion passes, knives and means for connecting the same to said plate and means for securing said knives to said wedge portion, said knives being beveled downwardly toward the smaller end of the wedge, substantially as described and for the purposes set forth.

In testimony whereof I affix my signature in presence of two witnesses.

PHILIP S. FITCH.

Witnesses:
D. E. DOZER,
JAY FITCH.